United States Patent [19]
Bick et al.

[11] Patent Number: 5,452,367
[45] Date of Patent: Sep. 19, 1995

[54] AUTOMATED METHOD AND SYSTEM FOR THE SEGMENTATION OF MEDICAL IMAGES

[75] Inventors: Ulrich Bick, Chicago; Maryellen L. Giger, Elmhurst, both of Ill.

[73] Assignee: Arch Development Corporation, Chicago, Ill.

[21] Appl. No.: 158,320

[22] Filed: Nov. 29, 1993

[51] Int. Cl.$^6$ .................................... G06F 159/00
[52] U.S. Cl. ................................ 382/128; 382/171
[58] Field of Search .................. 364/413.13, 413.14, 364/413.22, 413.16; 378/901, 37; 382/6, 9

[56] References Cited

U.S. PATENT DOCUMENTS

| | | | |
|---|---|---|---|
| 4,581,636 | 4/1986 | Blaker et al. | 348/163 |
| 4,907,156 | 3/1990 | Doi et al. | 364/413.13 |
| 5,133,020 | 7/1992 | Giger et al. | 364/413.23 |
| 5,164,976 | 11/1992 | Scheid et al. | 378/146 |
| 5,268,967 | 12/1993 | Jang et al. | 364/413.13 |

OTHER PUBLICATIONS

Fang-Fang Yin et al., "Comparison of Bilateral-Subtraction and Single-Image Processing Techniques in the Computerized Detection of Mammographic Masses", *Investigative Radiology*, vol. 28, No. 6, pp. 473-481, Jun. 1993.

*Primary Examiner*—Donald E. McElheny, Jr.
*Attorney, Agent, or Firm*—Oblon, Spivak, McClelland, Maier & Neustadt

[57] ABSTRACT

A method for the automated segmentation of medical images, including generating image data from radiographic images of the breast. The method is applicable to breast mammograms including the extraction of the skinline as well as correction for non-uniform exposure conditions, hand radiographs, and chest radiographs. Techniques for the segmentation include noise filtering, local gray value range determination, modified global histogram analysis, region growing and determination of object contour. The method also is applicable to skin detection and analysis of skin thickening in medical images, where image segmentation, local optimization of external skinline, creation of a gradient image, identification of the internal skinline and then skin thickness determination are carried out. The method for enhancement of medical images includes, after image segmentation and identification of the skinline, calculation of pixel distances from the skinline, determination of the enhancement parameter fit and then selective enhancement of the periphery.

46 Claims, 23 Drawing Sheets

KERNEL: 7 x 7 PIXEL RING

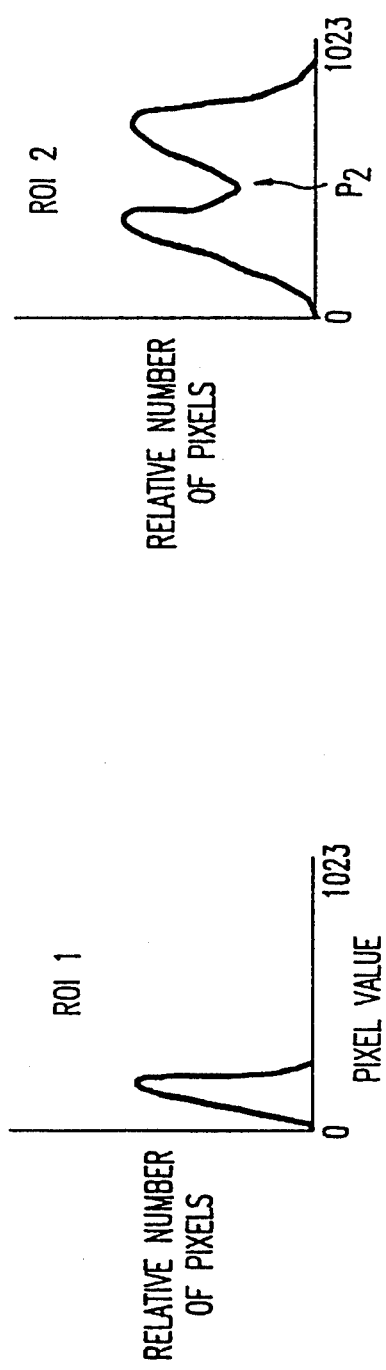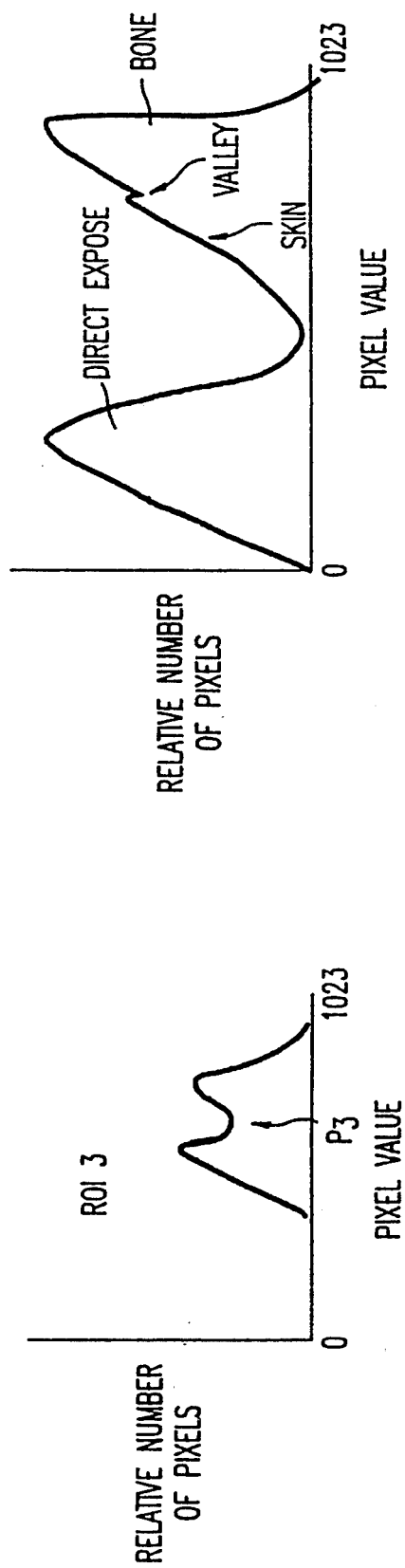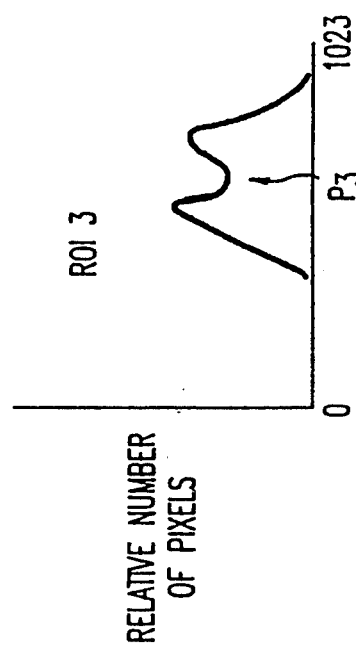
FIG. 14A  FIG. 14B  FIG. 14C  FIG. 14D

| | | | | | | | |
|---|---|---|---|---|---|---|---|
| | | | | | | | |
| | | | | | | | |
| | 16 | 34 | 17 | 25 | 23 | 20 | 16 |
| 23 | 35 | | | | | | 32 |
| | | | | | | | |
| | | | | | | | |

FIG. 18B

GRAY SCALE SKELETON

| | | | | | | | |
|---|---|---|---|---|---|---|---|
| | | | | | | | |
| | | 13 | 11 | 9 | 12 | 11 | 4 |
| 4 | 16 | 34 | 17 | 25 | 23 | 20 | 16 |
| 23 | 35 | 12 | 4 | 8 | 17 | 13 | 32 |
| 15 | 5 | | | | | | 11 |
| | | | | | | | |

FIG. 18A

SECOND DERIVATIVE OPERATOR IMAGE

AUTOMATED METHOD AND SYSTEM FOR THE SEGMENTATION OF MEDICAL IMAGES

The present invention was made in part with U.S. Government support under NIH grant/contract CA48985, Army grant/contract DAMD 17-93-J-3201, and American Cancer Society grant/contract FRA-390. The U.S. Government has certain rights in the invention.

BACKGROUND OF THE INVENTION

1. Field of the Invention

The invention relates generally to a method and system for the computerized automatic segmentation of medical images. Specific applications are given for breast mammograms including the extraction of the skin line as well as correction for non-uniform exposure conditions, for hand radiographs, and for chest radiographs. Techniques include novel developments and implementations including noise filtering, local gray value range determination, modified global histogram analysis, region growing and determination of object contour.

2. Discussion of the Background

Although mammography is currently the best method for the detection of breast cancer, between 10–30% of women who have breast cancer and undergo mammography have negative mammograms. In approximately two-thirds of these false-negative mammograms, the radiologist failed to detect the cancer that was evident respectively. The missed detections may be due to the subtle nature of the radiographic findings (i.e., low conspicuity of the lesion), poor image quality, eye fatigue or oversight by the radiologists. In addition, it has been suggested that double reading (by two radiologists) may increase sensitivity. It is apparent that the efficiency and effectiveness of screening procedures could be increased by using a computer system, as a "second opinion or second reading" to aid the radiologist by indicating locations of suspicious abnormalities in mammograms. In addition, mammography is becoming a high volume x-ray procedure routinely interpreted by radiologists.

If a suspicious region is detected by a radiologist, he or she must then visually extract various radiographic characteristics. Using these features, the radiologist then decides if the abnormality is likely to be malignant or benign, and what course of action should be recommended (i.e., return to screening, return for follow-up or return for biopsy). Many patients are referred for surgical biopsy on the basis of a radiographically detected mass lesion or cluster of microcalcifications. Although general rules for the differentiation between benign and malignant breast lesions exist, considerable misclassification of lesions occurs with current radiographic techniques. On average, only 10–20% of masses referred for surgical breast biopsy are actually malignant.

It is apparent that the efficiency and effectiveness of screening procedures could be increased by using a computer system, which is capable of segmenting the mammogram into breast and non breast regions, detecting the skin line and perform enhancement that allows viewing of the complete dynamic range without loss in contrast. The enhancement techniques could improve detection of various lesions by increasing their conspicuity. Also, accurate segmentation allows for determination of the skin line. Although breast skin thickening may occur in a variety of benign disorders like edema, inflammation or scarring, it can also indicate underlying malignant disease and may be the only mammographic sign of an inflammatory carcinoma. Also, such capabilities would be useful in other regions of the body, such as those examined by bone radiography and chest radiography.

SUMMARY OF THE INVENTION

Accordingly, an object of this invention is to provide an automated method and system for segmenting medical images.

Another object of this invention is to provide an automated method and system for the determination of skin line in medical images.

Another object of this invention is to provide an automated method and system for improving the display of medical images, such as mammograms.

These and other objects are achieved according to the invention by providing a new and improved automated method and system the segmentation of medical images. Specific applications are given for breast mammograms including the extraction of the skin line as well as correction for non-uniform exposure conditions, for hand radiographs, and for chest radiographs. Techniques include novel developments and implementations including noise filtering, local gray value range determination, modified global histogram analysis, region growing and determination of object contour.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 14A–14D are plots of the pixel distribution of ROIs of FIG. 13;

FIGS. 18A and 18B are diagrams illustrating a ridge-seeking algorithm;

DETAILED DESCRIPTION OF THE PREFERRED EMBODIMENTS

Figure 1:
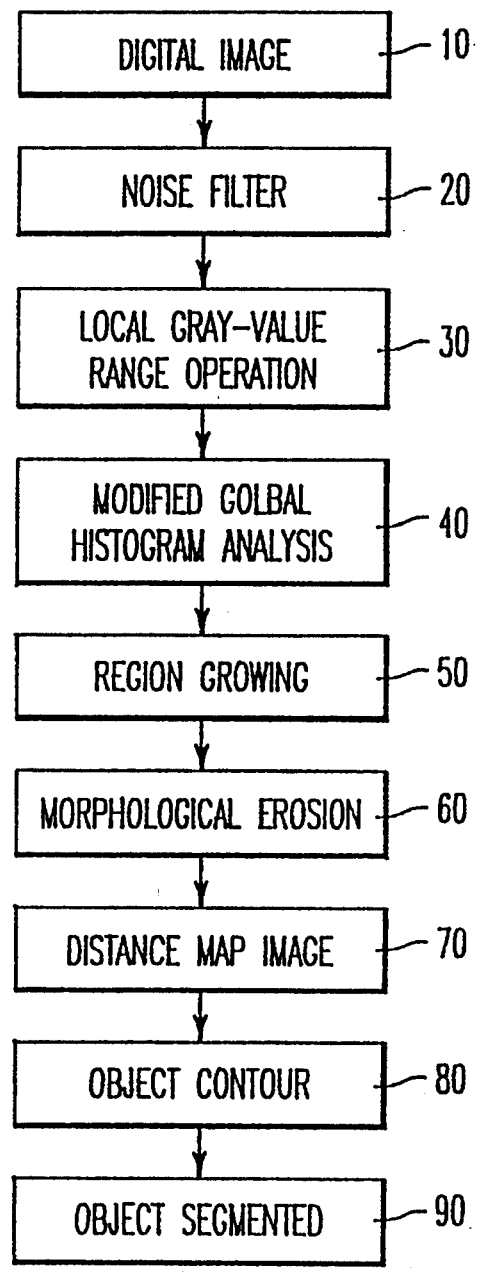
FIG. 1 is a schematic diagram illustrating the automated method for segmentation of medical images according to the invention.

Referring now to the drawings, and more particularly to FIG. 1 thereof, a schematic diagram of the automated method for the segmentation of breast images is shown. In this example the aim is to identify the breast region by excluding uniform dark (direct exposure) and uniform bright (unexposed) image regions. The method includes an initial acquisition of a radiograph of the breast and digitization (step 10). Noise filtering is applied to the digital image (step 20) followed by application of the gray-value range operator (step 30). Using information from the local range operator a modified global histogram analysis is performed (step 40). Region growing is performed on the threshold image using connectivity (counting pixels) in step 50, followed by a morphological erosion operation (step 60). The distance map of the image is determined (step 70) and the boundary of the segmented object in the image is then tracked to yield its contour (step 80). The contour can then be output onto the digital image or passed to other computer algorithms (step 90).

Initially noise filtering using a square median filter, 3 by 3 pixels in size, is employed in order to eliminate digitizer line artifacts and spike noise. The advantage of using a median filter is that the noise reduction process does not affect the smooth edges.

Figure 2:
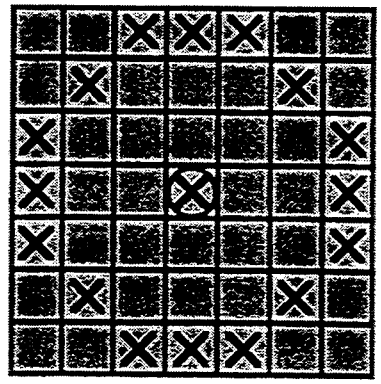
FIG. 2 is a schematic diagram illustrating the gray value range operator.

FIG. 2 shows a schematic diagram illustrating the application of the gray-value range operator. In this example, a 7 pixel by 7 pixel ring kernel is used to find the local maximum and local minimum pixel values. The difference between the local maximum and the center pixel value, and that between the center pixel value and the local minimum are calculated as the range and stored for later reference. Pixels yielding a small local gray-value range are considered as possible "non-object" (non-breast) pixels. The range is determined on the basis of the base width of a pixel histogram, as shown in FIG. 3.

Figure 3A:
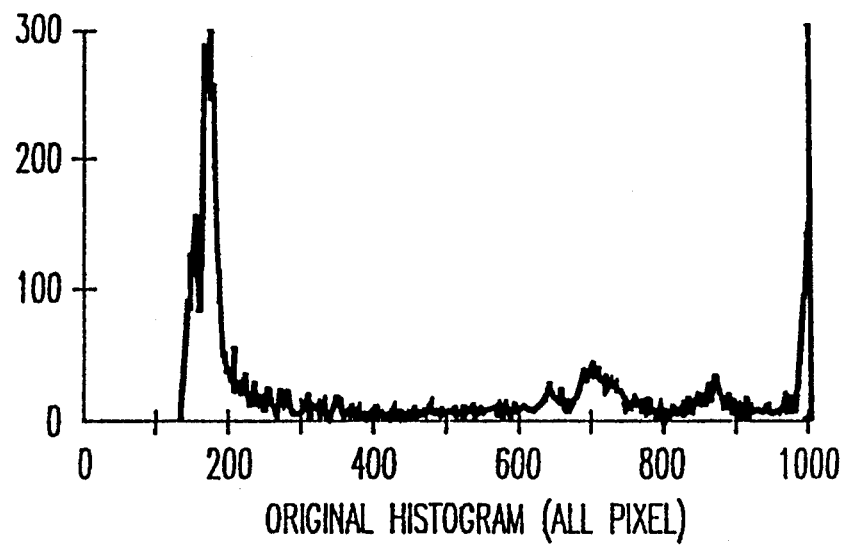
FIGS. 3A and 3B are graphs illustrating the modified global histogram analysis.
Figure 3B:
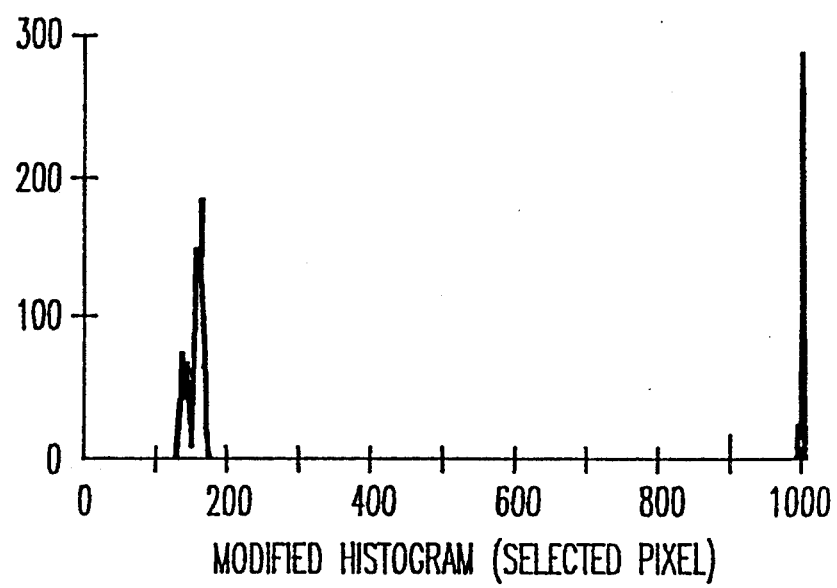

Next, the global gray-value histogram of the image is determined as illustrated in FIGS. 3A and 3B. The original histogram (FIG. 3A) contains gray values from all pixels in the image. The modified histogram (FIG. 3B) contains only contributions from pixels with a small local range (maximum–minimum value), which correspond to possible non-breast pixels.

Figure 4C:
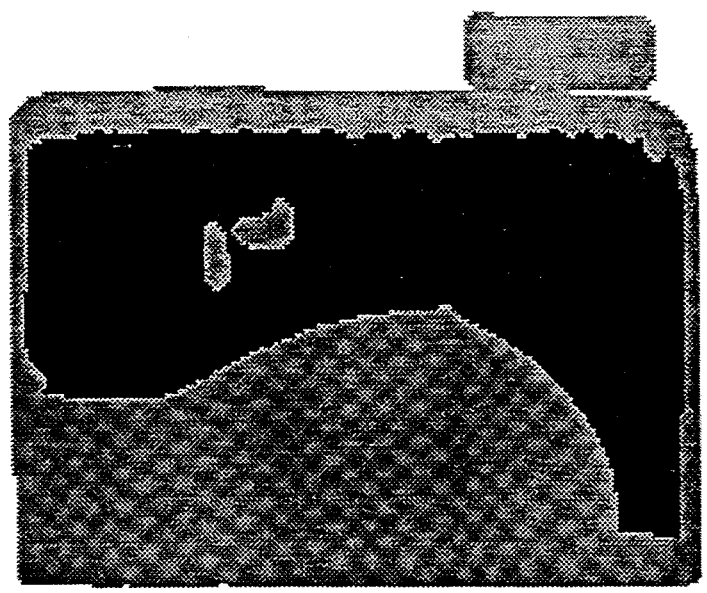
FIGS. 4A, 4B, 4C are schematic diagrams illustrating a partially segmented breast image at this stage of the method.
Figure 4B:
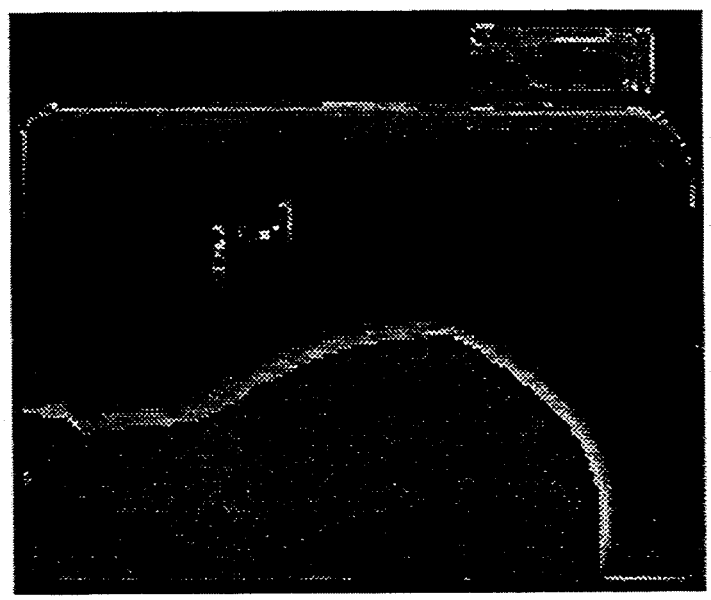
Figure 4A:
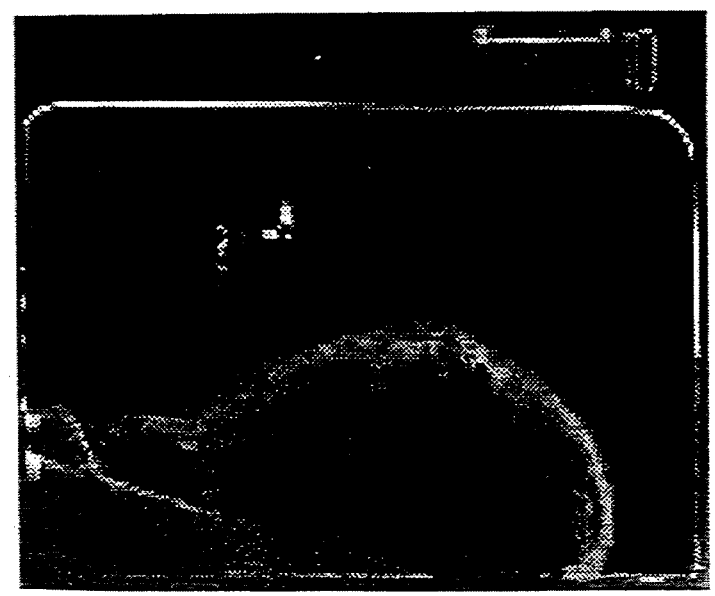

The criteria used in classifying a pixel as a non-breast pixel include (1) having a pixel value close to a global histogram peak, (2) having a small local gray value range and (3) being part of a large connected region. This can be thought as obtaining three sequential images. FIGS. 4A–4C illustrate the effect of these three classification criteria, respectively. The direct exposure region (with black corresponding to a gray level of zero) would have pixel values in which the local minimum must be small and the non exposed region (with white being at 1023) would have pixel values in which the local maximum must be small. After the first two criteria of the method, the image is in the form of a 3-gray-level image, where one value corresponds to potential breast pixel and the other two values correspond to potential non-breast pixel (either a no exposure region or a direct exposure region).

Knowledge of being in a large connected region is accomplished by region growing using connectivity, such as 4-point or 8-point. Also, another requirement is that the non-exposed region must be outside the direct exposure region (which is inside from the film edge). FIGS. 4C illustrates the partially segmented breast image at this stage of the method. The darker pixels correspond to non-breast pixels. It is noted that the image may contain pixels identified as possible breast pixels in the direct exposure region and in the border.

Figure 5:
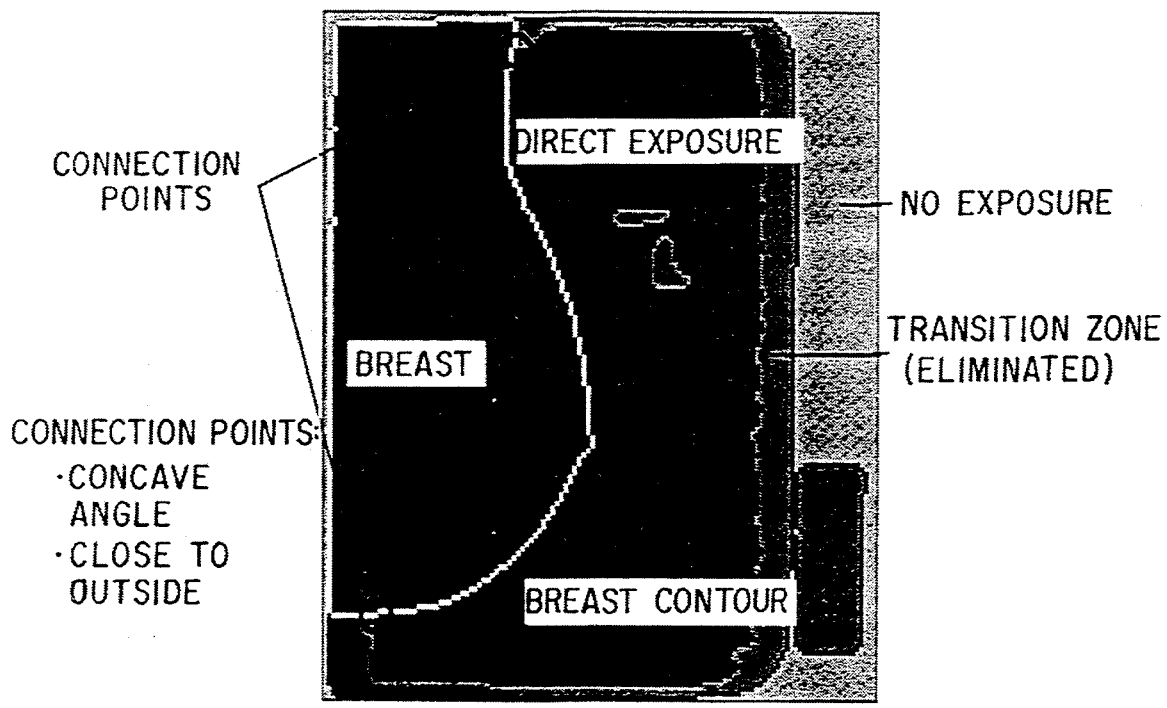
FIG. 5 is a schematic diagram illustrating determination of the object contour.
Figure 6A:
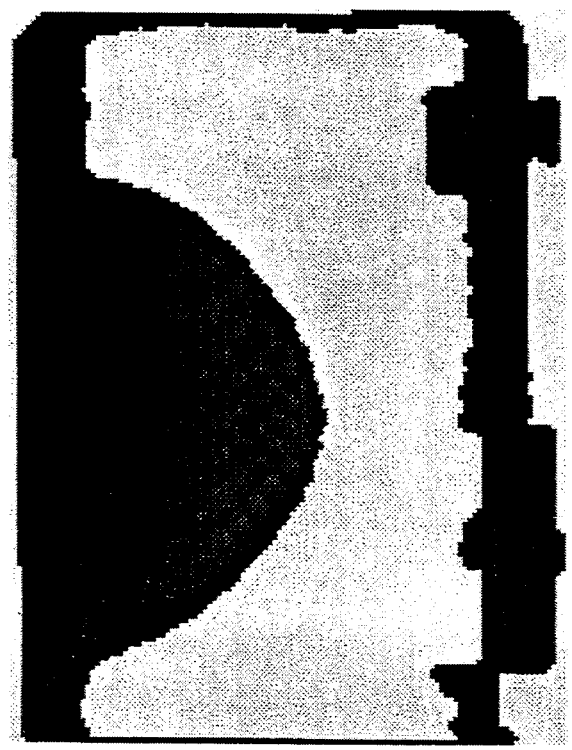
FIGS. 6A and 6B are schematics illustrating a distance map image and the subsequent threshold image.
Figure 6B:
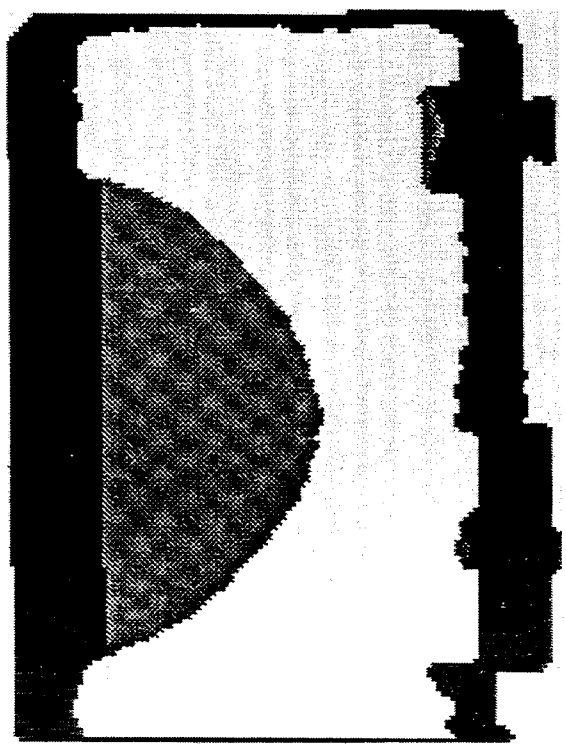

Next, the three-value image is subjected to a morphological erosion operation using a 3 pixel by 3 pixel square kernel. Such processing is necessary in order to prevent the "breast region" from including artifacts from the film digitization process, which may have gray values similar to pixels inside the breast region. The filtered binary image is then subjected to a contouring routine as illustrated in FIG. 5. Note, however, (by comparing FIGS. 4 and 5) that rules based on knowledge of the mammographic image need to be included in the contouring in order to identify and eliminate the "transition zone" between the direct and non-exposed regions (which is included in "breast region" in FIG. 4). Thus, the image becomes a four-value (2-bit) image. This is done as follows. The rules include analysis of connection points, corresponding to points with a concave angle and a short connected path to the outside, which are used in cutting across the transition zone. For examining connected paths, a distance map of the image is calculated as illustrated in FIGS. 6A and 6B. FIG. 6A illustrates the distance map image, and FIG. 6B illustrates the subsequent threshold image obtained by thresholding FIG. 6A. Here, darker pixels are closer to the film edge. The shortest connecting path of "breast object pixels" to the outside (i.e., film edge) is calculated for each pixel within the possible breast region in the 3-gray-level image. However, in the calculation, calculations of distance are only performed if the direction of the path does not cross a direct exposure region. The thresholding yields possible transition points which are then analyzed for presence of "sharp" concave angles.

Then, the contouring routine need only track the pixels having the single gray value corresponding to the breast region.

Figure 7:
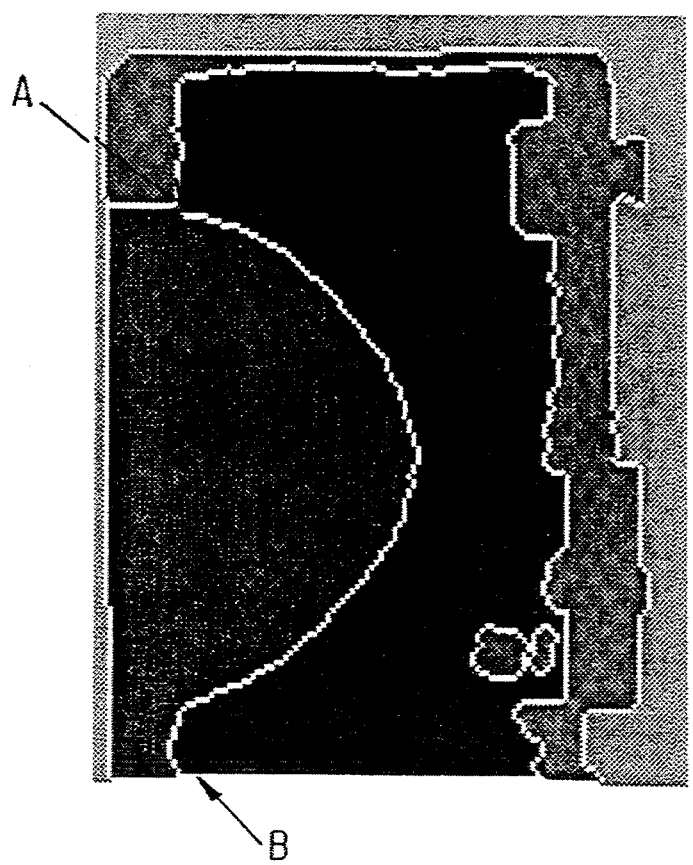
FIG. 7 is a schematic diagram illustrating a segmented breast in a digital mammogram.

FIG. 7 shows an example of a final segmented breast in a digital mammogram, showing an allowed connection at point A. At point B, the connection was not made since the concave angle was not sufficiently sharp. The degree of sharpness required to make the connection is empirically derived.

Figure 8:
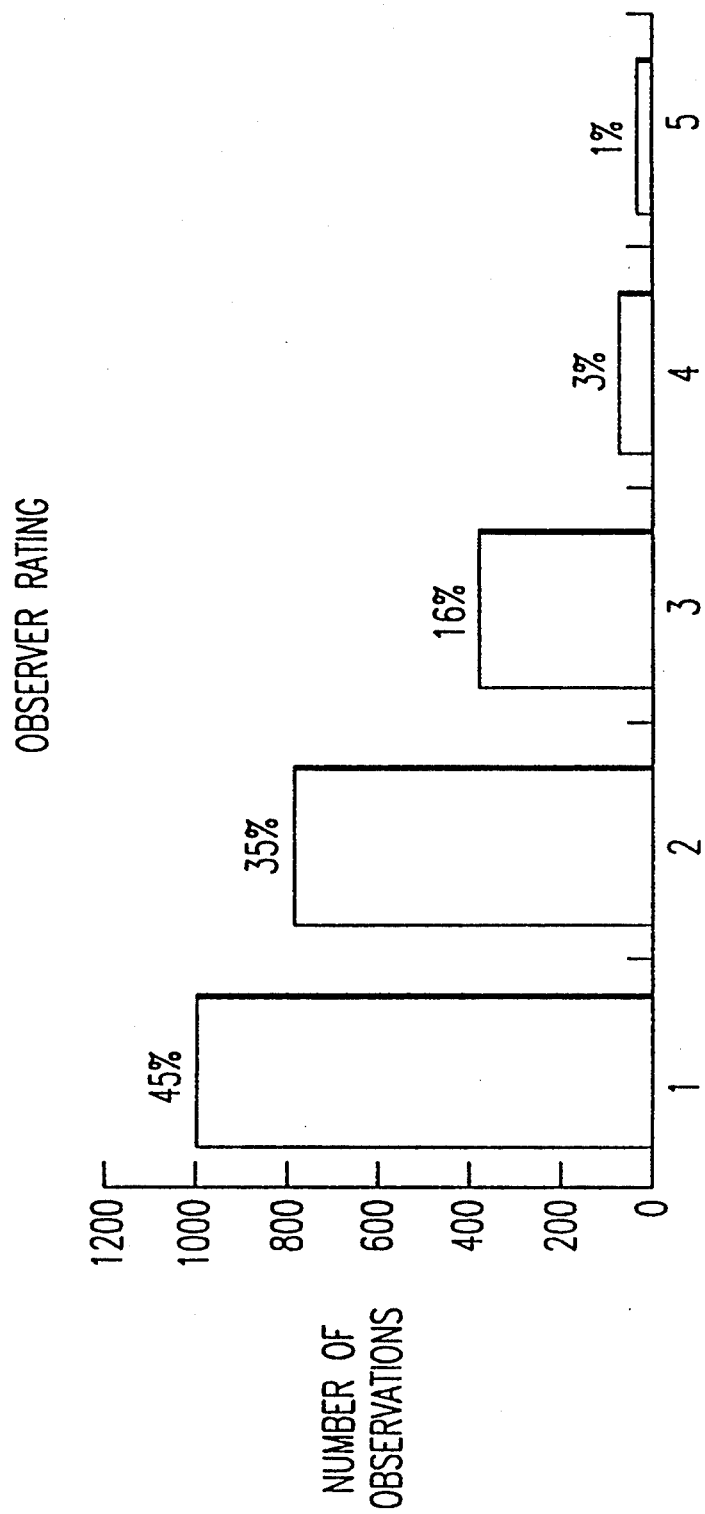
FIG. 8 is a graph illustrating the performance of the segmentation method, evaluated on 740 mammograms. The ratings were subjectively assigned by 3 observers.

FIG. 8 is a graph illustrating the performance of the segmentation method, evaluated on 740 mammograms. The ratings were subjectively assigned by 3 observers. Note that 96% were considered acceptable for use as input to further computerized mammographic analysis methods. In the rating scale (x-axis) of FIG. 8, (1) corresponds to optimal, (2) to minor deviations, (3) to acceptable for CAD purposes, (4) to substantial deviations, and (5) to complete failure of segmentation.

Figure 9:
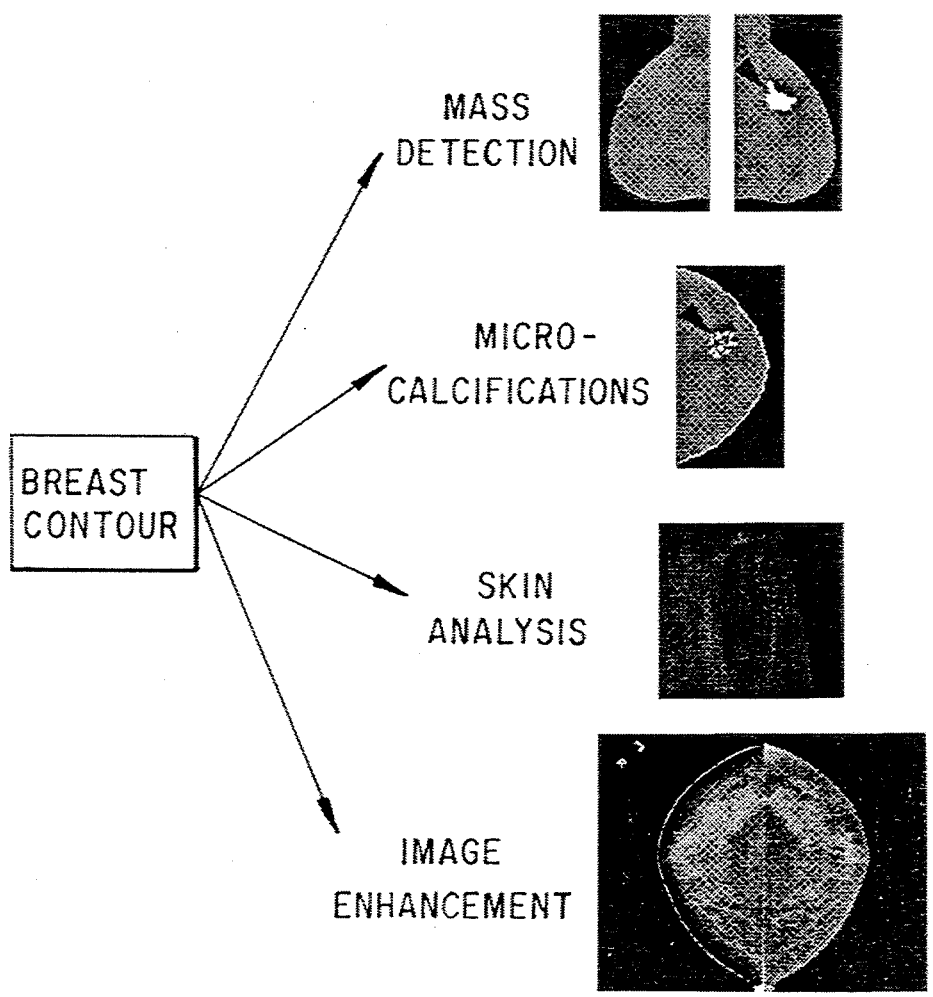
FIG. 9 is a schematic diagram illustrating how the segmentation method could be incorporated within a computer-aided diagnosis scheme for mammography.

The segmentation method could be employed in an iterative manner as illustrated in FIG. 9. In this implementation, various parameters of the method could be iteratively tried in order to segment the breast in images obtained from various film digitizers or direct digital devices.

Figure 10:
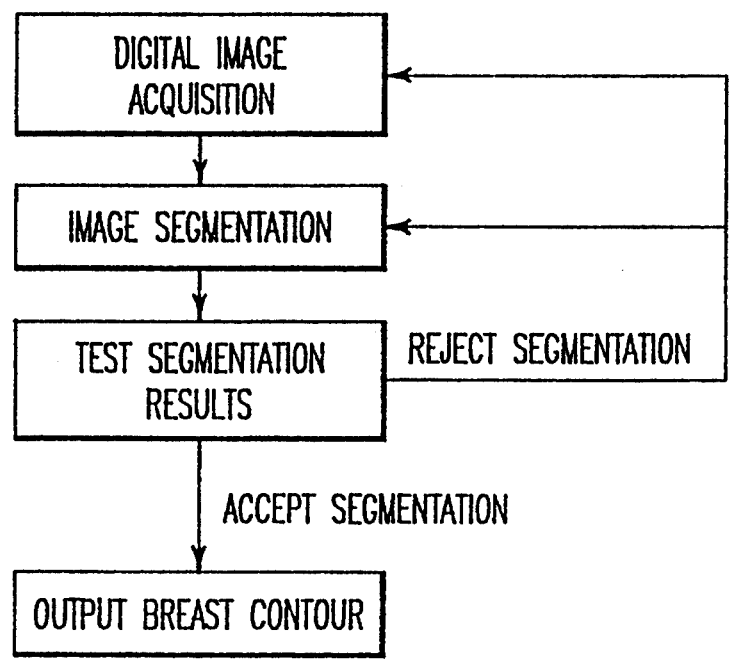
FIG. 10 is a schematic diagram illustrating various uses of the segmenter when breast contour determination is necessary.

FIG. 10 shows examples of how the computer-determined breast contour (found from breast segmentation) could be further used in such methods as mass detection, microcalcification detection, and skin analysis in computer-aided diagnosis schemes, and image enhancement.

Figure 11:
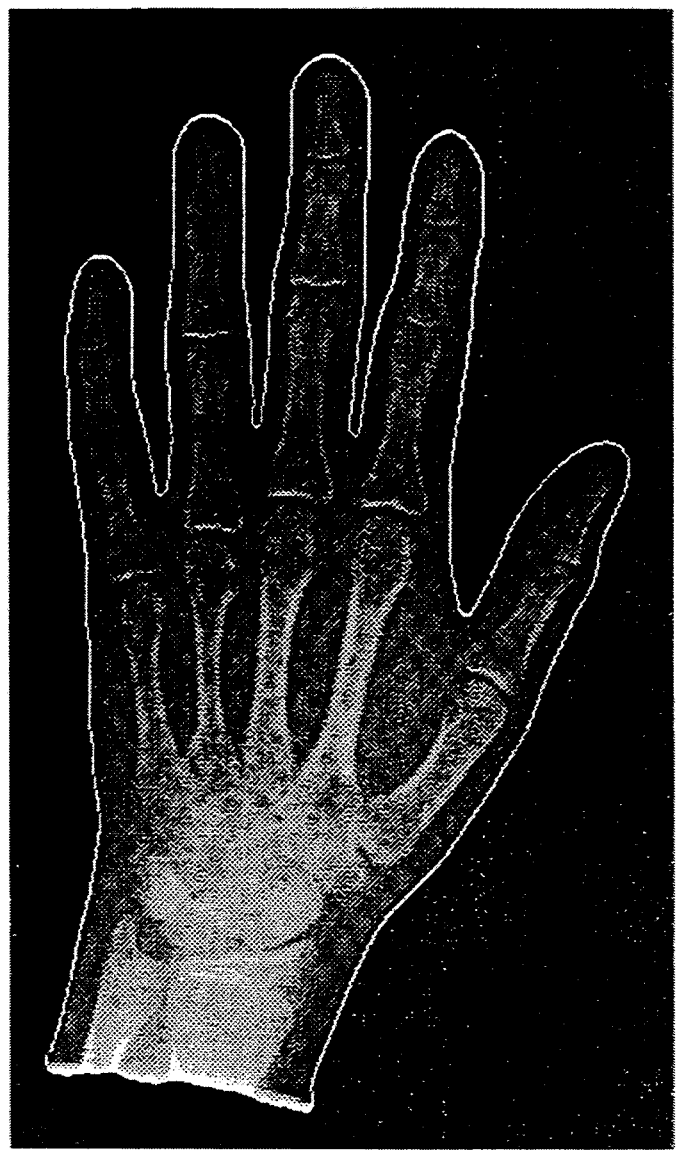
FIG. 11 is a schematic diagram illustrating a segmented hand in a digital bone radiograph.
Figure 12:
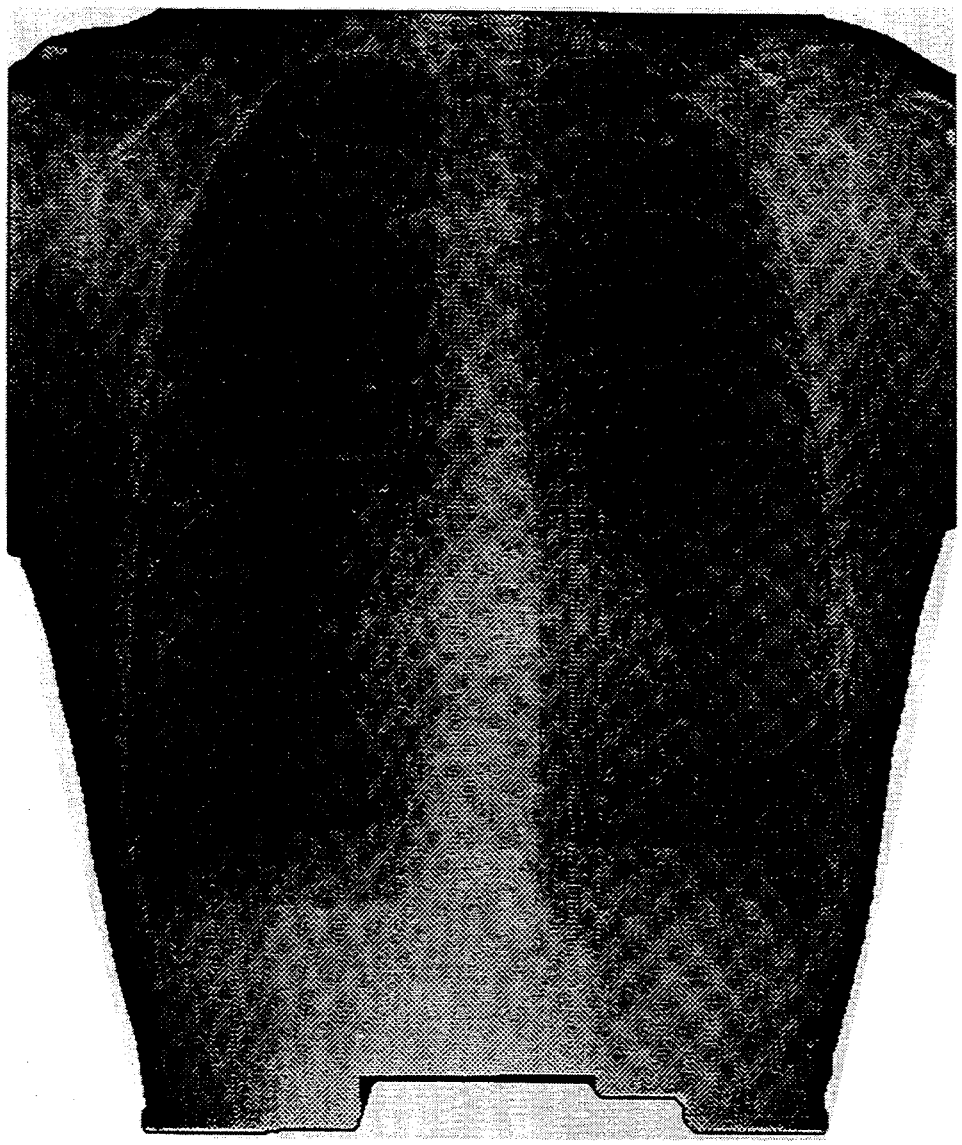
FIG. 12 is a schematic diagram illustrating a segmented chest in a digital chest radiograph.

The segmentation can be used in other medical imaging applications including segmentation of the hand in bone radiographs as showed in FIG. 11, and segmentation of the chest in images of the thorax as shown in FIG. 12.

Figure 13:
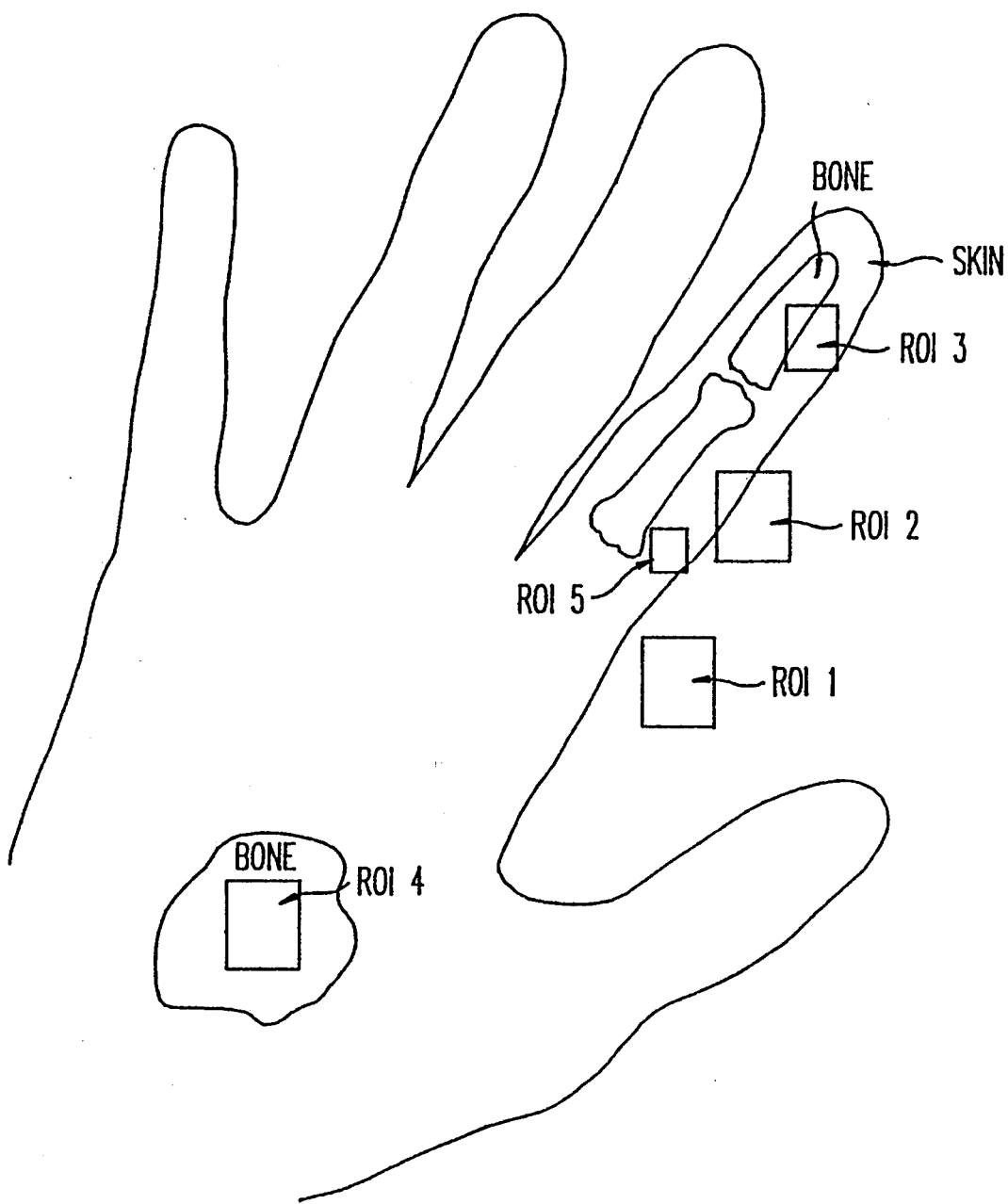
FIG. 13 is a schematic diagram of threshold of an image of the hand.

In the segmentation of the hand from the directly exposed region, both global and local thresholding can be used. Local thresholding is used to segment bone from skin. As shown in FIG. 13, a number of ROIs (ROI1–ROI5, in this example) can be placed on the hand image. The corresponding pixel distributions for ROI1–ROI3 are shown in FIGS. 14A–14C. As ROI1 is entirely in the directly exposed region, the pixel distribution shows a single peak with no valley (FIG. 14A). Thus the center pixel of ROI1 is set to a constant $K_1$. In ROI2, a valley is found at gray level $p_2$. If the center pixel in ROI2 has a gray value less than $p_2$, then the center pixel is assigned a gray value of $K_2$. If the center pixel in ROI2 has a gray value greater than $p_2$, then the center pixel is assigned a gray value of $K_3$. In ROI3, a valley is found at gray level $p_3$. The center pixel of ROI3 is assigned gray value $K_2$ or $K_3$ if its gray value is less than or greater than $p_3$, respectively. It should be noted that ROI4 and ROI5 will have a single peak distribution similar to FIG. 14A as ROI4 is entirely within the bone and ROI5 is entirely within the skin.

The advantage of the local thresholding is that the peak shown in ROI3 may be too small to be detected on a histogram of an entire image, as shown in FIG. 14D.

Figure 15:
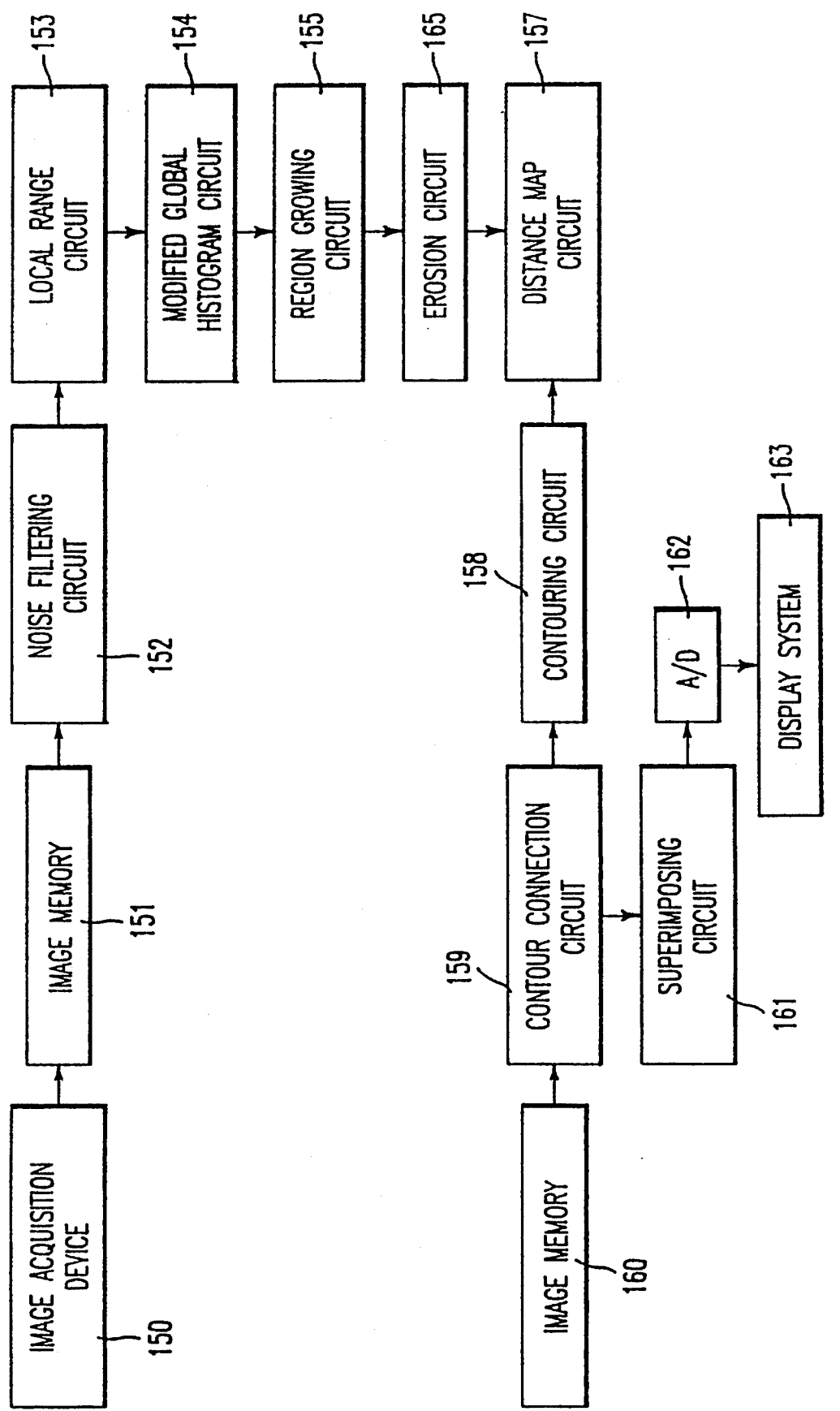
FIG. 15 is a schematic block diagram illustrating a system for implementing the automated method for segmentation of medical images according to the invention.

FIG. 15 is a more detailed schematic block diagram illustrating a system for implementing the method of the invention for automated segmentation of medical images. Referring to FIG. 15, radiographic images of an object are obtained from an image acquisition device 150 which could be an x-ray exposure device and a laser digitizer, and input to the system. Each breast image is digitized and put into memory 151. The image data is first passed through a noise filtering circuit 152 and a local gray-value range circuit 153 in order to determine the initial potential regions of breast and non-breast. The data is then passed to the modified global histogram analysis circuit 154 and the region growing circuit 155 in order to determine a partial segmentation. Image data are passed to the morphological erosion circuit 156, the distance map circuit 157, and the initial contouring circuit 158 which determines the contour by evaluating the thresholded image data after the distance map is obtained, in order to determine the features for input to the contour connection circuit 159. During the determination of the transition zone (as shown in FIG. 5), the data are retained in image memory 160. In the superimposing circuit 161 the results are either superimposed onto breast images, stored in file format, or shown with all non-breast regions set to a constant gray value. The results are then displayed on the display system 163 after passing through a digital-to-analog converter 162.

Figure 16:
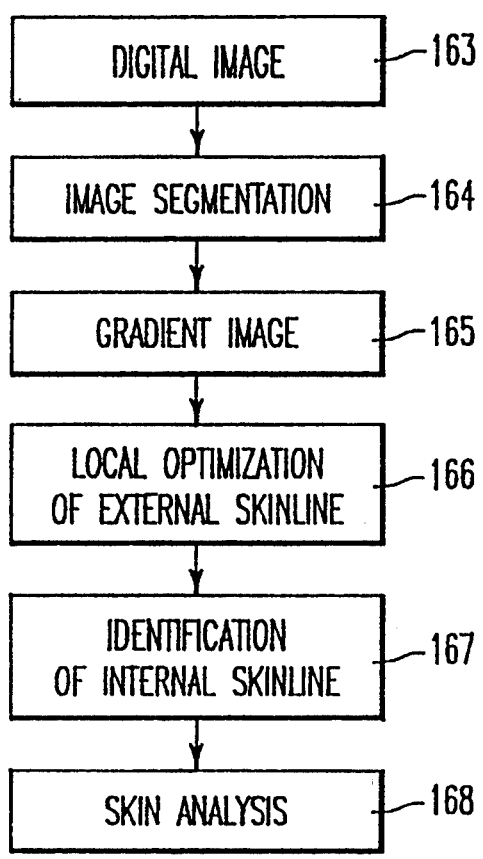
FIG. 16 is a schematic diagram of the method for the automated detection of skin thickening.

The segmented breast image can then be used as input to a method for the automated detection of skin detection and skin thickening as shown in FIG. 16. After obtaining the digital image (step 163), the digital image is segmented (step 164). A gradient image of the breast is created using, for example, a 3 pixel by 3 pixel Sobel operator (step 165). Next, local optimization of external skinline is performed (step 166). The potential internal skinline points are identified as a local gradient minimum within a certain distance from the outside breast contour (step 167). An optimal track along the internal skinline points is found using an energy function based on connectivity and distance from the outside breast contour. This energy function is empirically derived. Finally, the skin thickness is measured perpendicular to the outside breast contour at each point (step 168).

Figure 17:
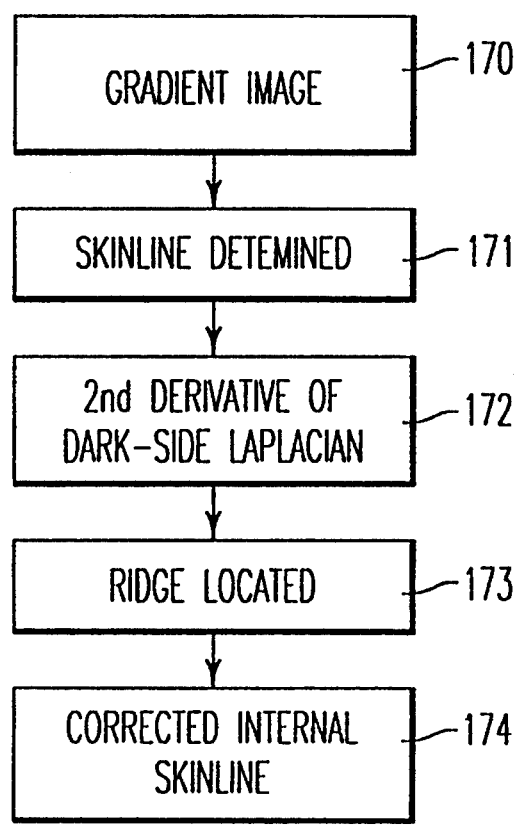
FIG. 17 is a schematic diagram showing the method for the local optimization of the external skinline, in which the contour of the breast is straightened.

FIG. 17 illustrates the local optimization of the external skinline, in which the contour of the breast is straightened. Since the segmentation matrix containing the skinline is subsampled, inaccuracies in segmentation relative to the subsampling factor occur. After the gradient image is calculated (step 170) and the skinline is determined (step 171), the second derivative of a dark side LaPlacian is calculated (step 172). The ridge of the second derivative local maximum is found using a ridge seeking algorithm (step 173). This yields an improved skinline without the inaccuracies from subsampling (step 174).

An example of the ridge-seeking algorithm is shown in FIGS. 18A and 18B. These two figures show gray scale values of pixels of a portion of the image. The ridge-seeking algorithm produces a gray scale skeleton (four-point connected line of local maxima). As can be seen from FIG. 18B, the maxima "ridge" has been extracted from FIG. 18A, thereby improving the skinline.

Figure 19:
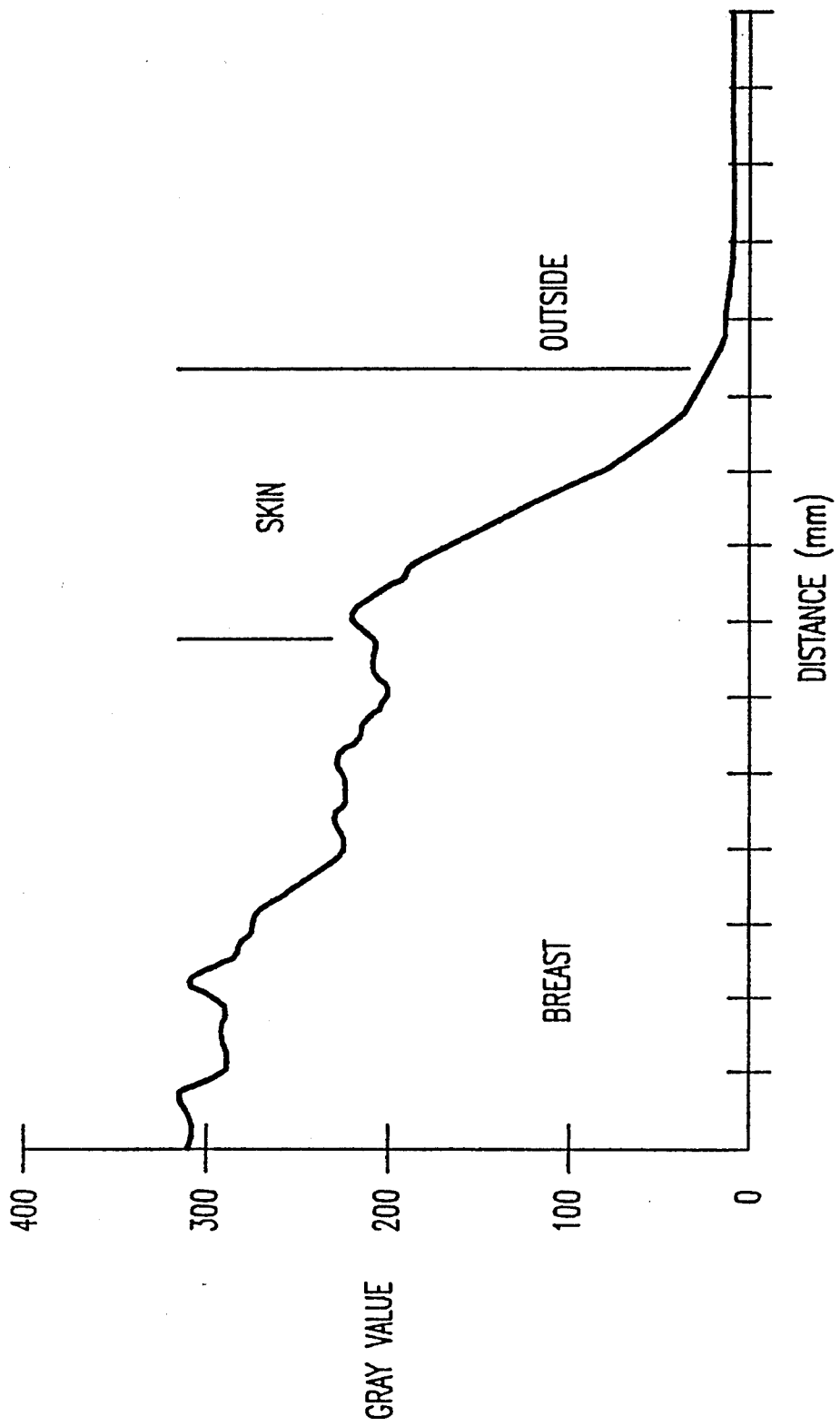
FIG. 19 is a graph showing the gray value profile of a breast perpendicular to the outside breast border.
Figure 20:
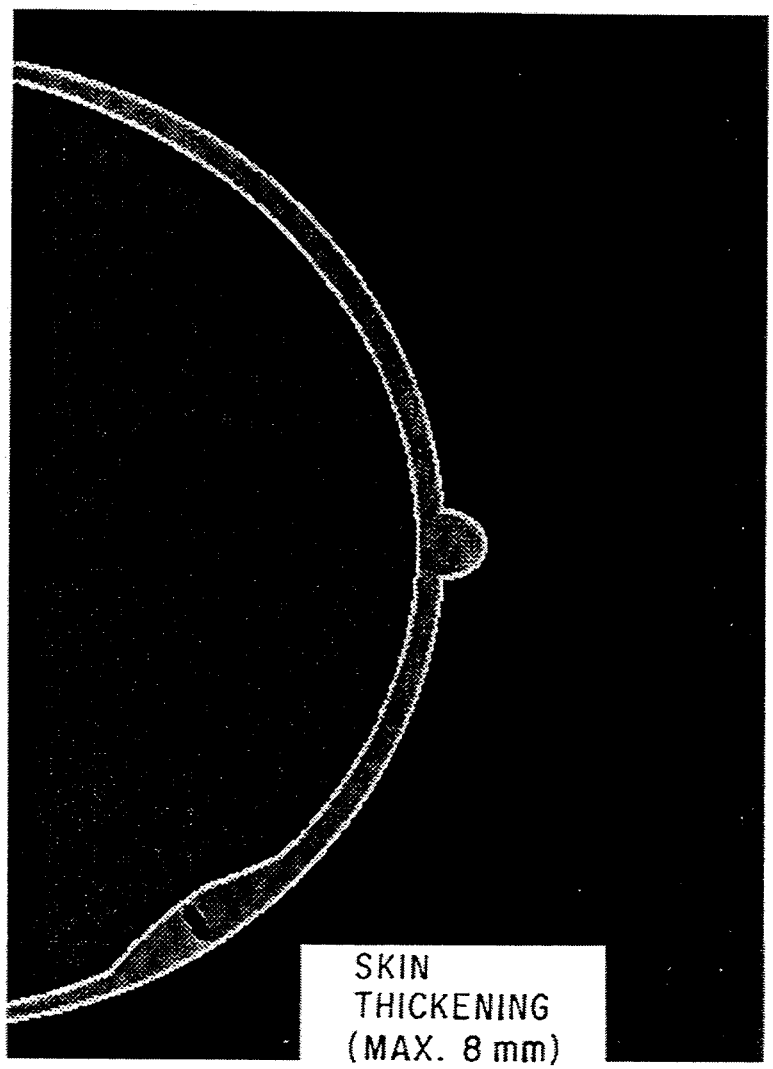
FIG. 20 is a schematic diagram showing the output from the skin thickening method.

FIG. 19 is a graph showing the gray-value profile of a breast perpendicular to the outside breast border. The internal skin contour is identified as a local gradient minimum (as seen in FIG. 19). Skin thickness in this example measures approximately 3 mm. The output from the skin detection method is schematically demonstrated in FIG. 20, in which the light gray colored region corresponds to the skin. The nipple has been indicated as well as a skin thickening.

To assess the accuracy of the computerized method, two expert mammographers marked the external and internal skin borders in five mammograms with skin thickening ranging between 4 mm and 2.2 cm. The distance between each point marked by the radiologists and the computer was calculated. Good correlation was found between the computer results and the points marked by the radiologists. The mean distance between the markings by the radiologists and the computer was less than 1 mm in all cases.

Figure 21:
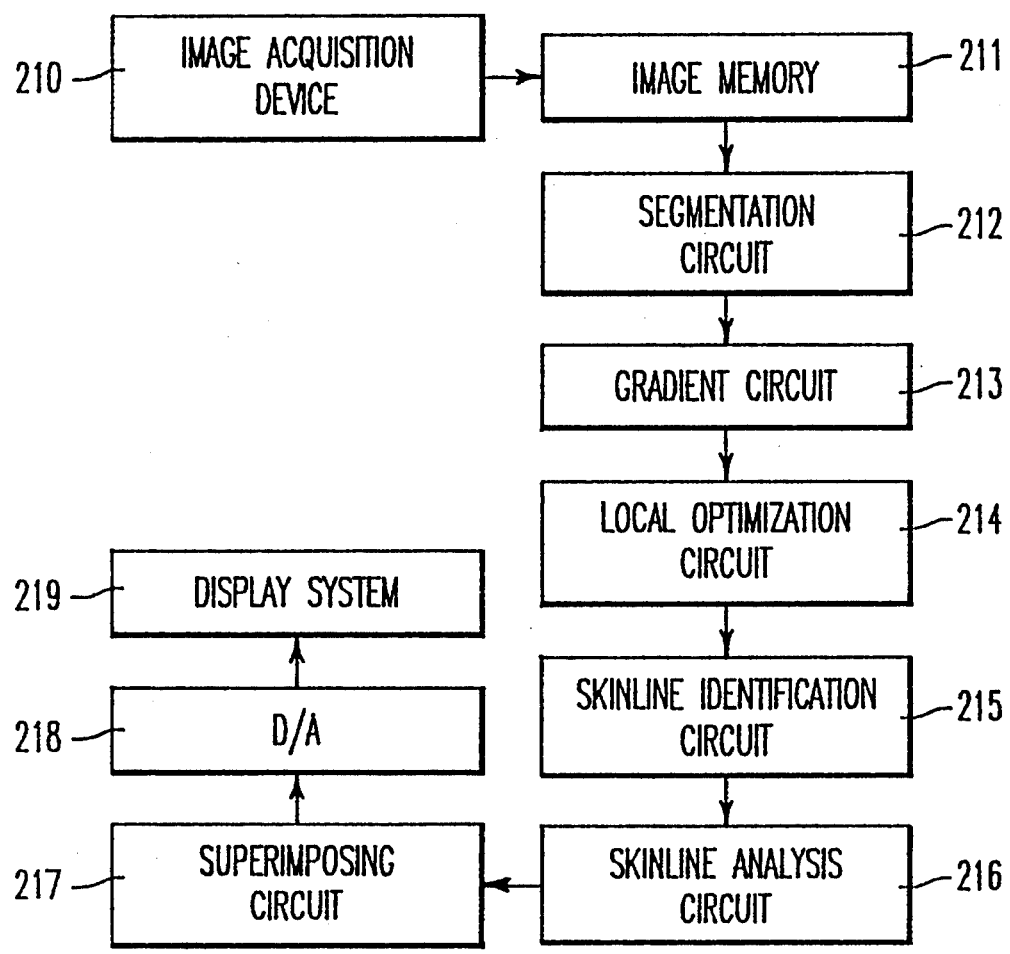
FIG. 21 is a schematic block diagram illustrating a system for implementing the automated method for the automated detection of skin thickening.

FIG. 21 is a more detailed schematic block diagram illustrating a system for implementing the method of the invention for automated determination of skinline and skin thickening. Referring to FIG. 21, radiographic images of an object are obtained from an image acquisition device 210 and input to the system. Each breast image is digitized by device 210 and put into memory 211. The image data is first passed through a segmentation circuit 212 and the gradient image producing circuit 213. The data is passed to an external skinline local optimization circuit 214 and the skin line determination circuit 215 in order to determine the internal and external skin lines. Data are passed to the skin analysis circuit 216 in order to determine skin thickening. In the superimposing circuit 217 either the skinlines are superimposed onto breast images, stored in file format or output in terms of skin thickening. The results are then displayed on the display system 219 after passing through a digital-to-analog converter 218.

Figure 22:
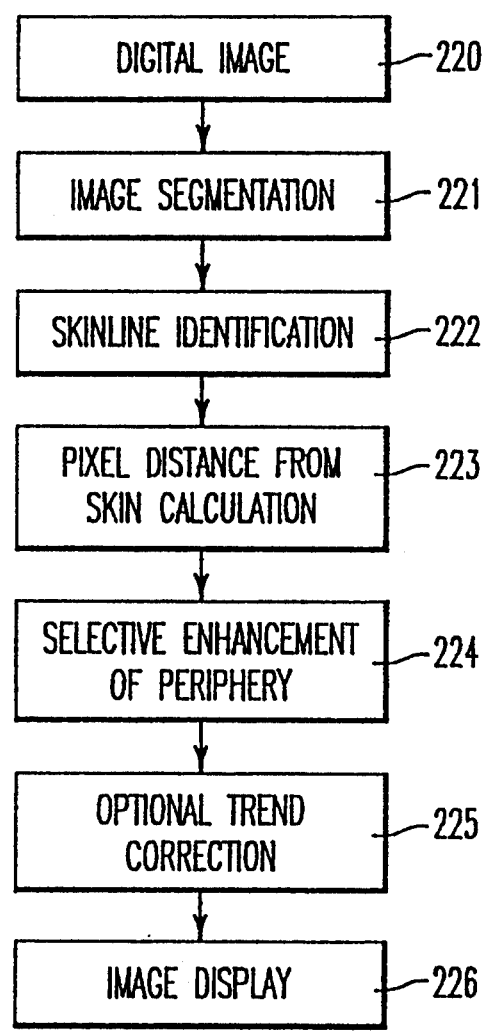
FIG. 22 is a schematic diagram illustrating the method for the improved display of digital images.

The segmented breast image can also be used as input to the method for the automated detection of skin detection and skin thickening as shown in FIG. 22. After obtaining the image (step 220), segmentation (step 221) and identification of the external skinline (step 222), the Euclidean distance for each potential breast pixel to the external skinline is calculated (step 223). Next, the average gray value as a function of distance from the external skinline is examined and used in determining the enhancement factor (step 224). This enhancement selectively enhances the peripheral region in order to simultaneously display the center of the breast and the skinline regions without loss in contrast. The trend can be corrected (step 225) and then displayed (step 226).

Figure 23:
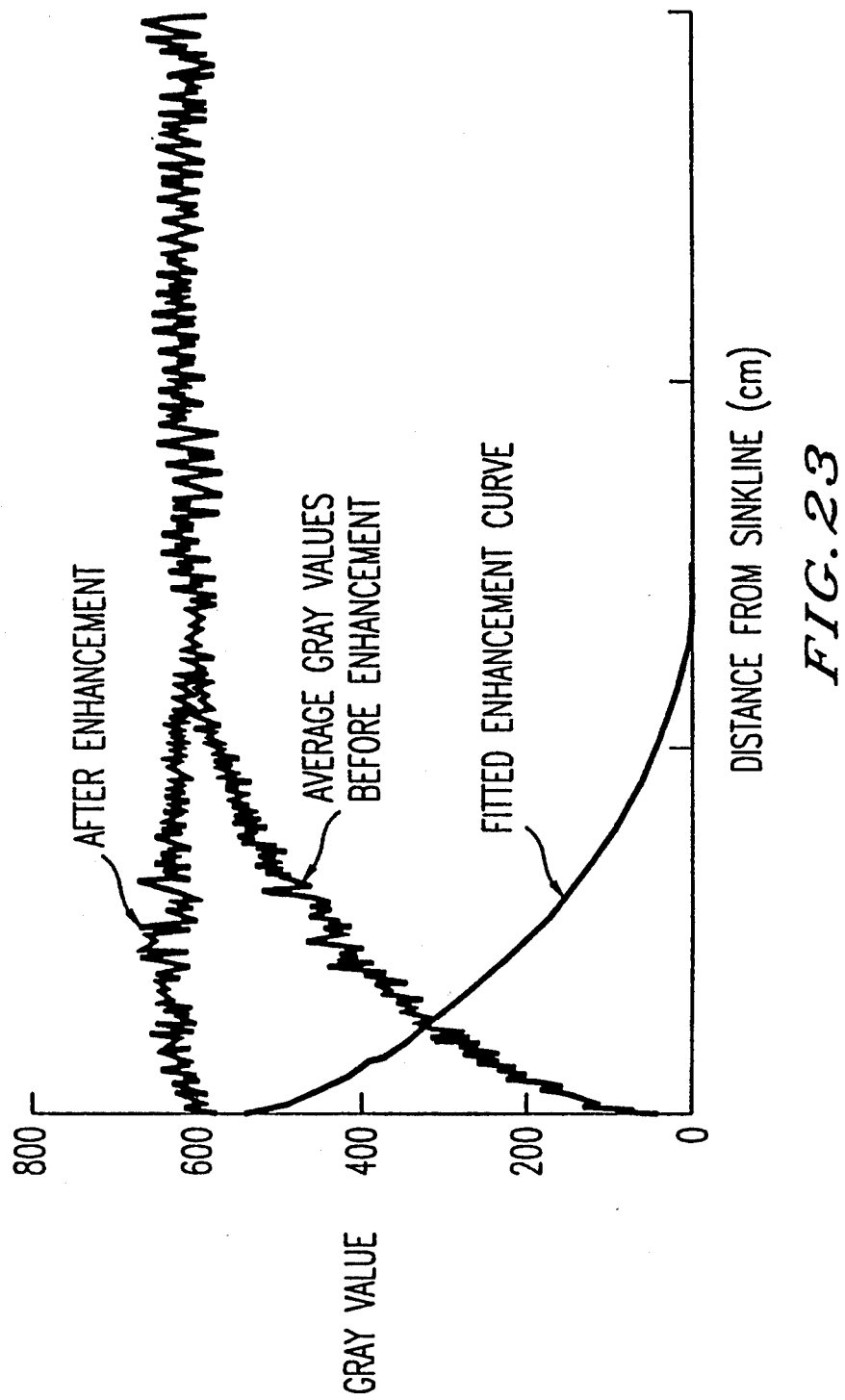
FIG. 23 is a graph showing the average gray values along a distance from the skinline before and after enhancement. Also shown is the fitted enhancement curve.

A graph showing the average gray values along a distance from the skinline is given in FIG. 23. The gray values as a function of distance from the skinline are given before and after the enhancement method. The enhancement curve is obtained from a reversal of a fitted curve (such as a polynomial fit) to the average gray values (prior to enhancement) as a function of distance from the skinline. Constraints include the need for the fitted curve to have continuously smaller values, i.e. smaller gray values as distance increases. The values from the enhancement curve can be added to the corresponding pixels at the particular distance if the average gray value curve to produce the enhanced gray value curve. Other operations, besides addition, can also be used.

Figure 24:
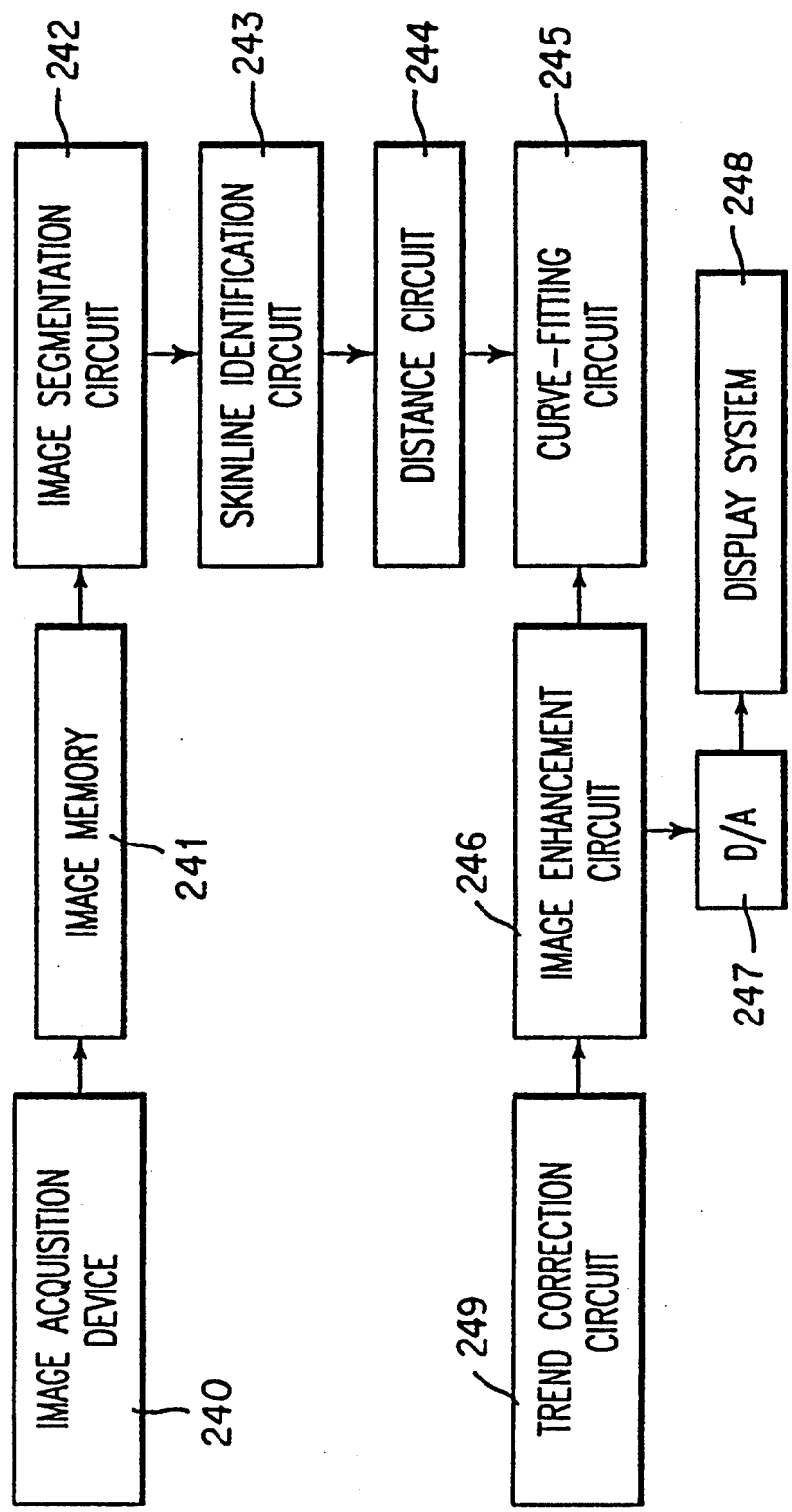
FIG. 24 is a schematic block diagram illustrating a system for implementing the automated method for the improved display of digital images.

FIG. 24 is a more detailed schematic block diagram illustrating a system for implementing the method of the invention for automated enhancement of medical images. Referring to FIG. 24, radiographic images of an object are obtained from an image acquisition device 240 and input to the system. Each breast image is digitized and put into memory 241. The image data is first passed through the segmentation circuit 242 and the external skinline identification circuit 243. The data is passed to the distance circuit 244 and the curve fitting circuit 245. Data are passed to the image enhancement circuit 246 in order to process the image. The processed image is then displayed on the display system 248 after passing through a digital-to-analog converter 247. The trend may also be corrected via trend correcting circuit 249.

Obviously, numerous modifications and variations of the present invention are possible in light of the above technique. It is therefore to be understood that within the scope of the appended claims, the invention may be practiced otherwise than as specifically described herein. Although the current application is focused on radiographic medical images, the concept can be expanded to segmentation in other images of the human body.

What is claimed as new and desired to be secured by letters patent of the United States is:

1. A method of segmentation of an image of an anatomic feature of a subject, comprising:
   obtaining said image of said anatomic feature;
   obtaining a global histogram using said image;
   modifying said global histogram to obtain a modified global histogram; and
   segmenting said image using said modified global histogram.

2. A method as recited in claim 1, wherein modifying said global histogram comprises:
   determining local minimum pixel values in said image;
   determining local maximum pixel values in said image;
   determining a gray value range using said local minimum and said local maximum pixel values; and
   modifying said global histogram using said range.

3. A method as recited in claim 2, wherein segmenting said image comprises:
   classifying a pixel in said image as a non-feature pixel based upon said gray value range, upon whether said pixel is in a vicinity of a gray value peak of said modified histogram, and upon whether said pixel is part of a connected region; and
   obtaining a first segmented image containing first pixels having a gray value corresponding to a feature pixel and second pixels having at least one gray value corresponding to said non-feature pixel.

4. A method as recited in claim 3, wherein classifying said pixel in said image based upon whether said pixel is part of said connected region comprises region growing.

5. A method as recited in claim 3, comprising:
   performing a morphological open operation on said first segmented image to obtain a second segmented image; and
   performing a contouring routine on said second segmented region.

6. A method as recited in claim 3, comprising:
   determining a distance map of said first segmented region.

7. A method as recited in claim 6, wherein determining said distance map comprises:
   determining a connection path for each first pixel in said first segmented image; and
   thresholding said distance map based upon said connection path.

8. A method as recited in claim 7, wherein determining said connection path comprises:
   calculating a distance from each first pixel to an edge of said first segmented image if a corresponding connection path does not cross a region of said first segmented image corresponding to a directly exposed region of said image.

9. A method as recited in claim 7, comprising:

thresholding said distance map to generate a second segmented image having pixels corresponding to said feature pixels; and
determining a contour of said feature using said second segmented region.

10. A method as recited in claim 9, wherein determining said contour comprises:
analyzing points along said contour having a connection path to an edge of said second segmented region less than a predetermined length and a concave angle.

11. A method as recited in claim 9, wherein determining said contour comprises:
analyzing points along said contour having a connection path to an edge of said second segmented region crossing a transition zone corresponding to an area in said image between a directly-exposed area and a non-exposed area with a length less than a predetermined length and a concave angle.

12. A method as recited in claim 1, comprising:
obtaining a contour of said feature in said segmented image; and
analyzing points along said contour where said feature connects with a transition zone corresponding to an area in said image between a directly-exposed area and a non-exposed area.

13. A method as recited in claim 1, comprising:
digitizing said image of said feature to obtain a digitized image; and
performing noise filtering on said digitized image to obtain a filtered image;
wherein modifying said global histogram comprises:
determining local minimum pixel values in said filtered image;
determining local maximum pixel values in said filtered image;
determining a gray value range using said local minimum and said local maximum pixel values; and
modifying said global histogram using said range.

14. A method as recited in claim 2, wherein segmenting said image comprises:
determining a first segmented image by classifying first pixels in said image as non-feature pixels based upon said gray value range;
determining a second segmented image by classifying second pixels in said first segmented image as said non-feature pixels based upon whether said second pixels are in a vicinity of a gray value peak of said modified histogram; and
determining a third segmented region by classifying third pixels in said second segmented image as said non-feature pixels based upon whether said third pixels are part of a connected region.

15. A method as recited in claim 14, comprising:
obtaining a fourth segmented image containing fourth pixels having a gray value corresponding to a feature pixel and fifth pixels having at least one gray value corresponding to a non-feature pixel.

16. A method as recited in claim 1, comprising:
obtaining a radiographic breast image; and
segmenting said breast in said radiographic breast image.

17. A method as recited in claim 16, comprising:
obtaining a contour of said breast in said segmented image; and
analyzing points along said contour where said breast connects with a transition zone corresponding to an area in said image between a directly-exposed area and a non-exposed area.

18. A method as recited in claim 1, comprising:
obtaining a radiographic hand image; and
segmenting said hand from said image using local thresholding.

19. A method as recited in claim 18, wherein said local thresholding comprises:
placing a predetermined number of regions-of-interest each having a plurality of pixels on said hand image;
determining a distribution of said pixels in each of said regions-of-interest; and
setting selected pixels in each of said regions-of-interest to a predetermined value based upon corresponding distributions of said pixels.

20. A method as recited in claim 1, wherein:
said step of segmenting said image produces a segmented image; and
said method further comprises:
determining an external skinline of said feature using said image segmented image;
determining an internal skinline of said feature using said segmented image; and
measuring a skin thickness of said feature using said internal and external skinlines.

21. A method as recited in claim 20, comprising:
obtaining a gradient image of said segmented image; and
determining said internal and external skinlines using said gradient image.

22. A method as recited in claim 20, wherein determining said internal skinline comprises:
obtaining a gray value profile perpendicular to a border of said feature; and
determining a local gradient minimum in said gray value profile as said internal skinline.

23. A method as recited in claim 20, wherein determining said external skinline comprises:
determining an initial external skinline of said feature;
calculating a second derivative of a dark-side LaPlacian; and
determining said external skinline as a ridge in said second derivative.

24. A method as recited in claim 23, wherein determining said external skinline as said ridge comprises:
determining a gray scale skeleton of pixels in said gradient image; and
determining a maxima ridge in said skeleton as said external skinline.

25. A method as recited in claim 20, further comprising determining skin thickening using said internal and external skinlines.

26. A method as recited in claim 20, further comprising superimposing said internal and external skinlines on said image.

27. A method as recited in claim 1, wherein:
said step of segmenting said image produces a segmented image; and
said method further comprises:
determining an external skinline using said segmented image;
calculating a distance of pixels of said image being potential feature pixels to said external skinline;
determining an average gray value of said potential feature pixels as a function of said distance; and
enhancing a periphery of said image using said average gray value.

28. A method of segmenting and determining a skinline in an image of an anatomic feature of a subject, comprising:
obtaining said image of said anatomic feature;
segmenting said image to obtain a segmented image;
determining an external skinline of said feature using said segmented image;
determining an internal skinline of said feature using said segmented image; and
measuring a skin thickness of said feature using said internal and external skinlines.

29. A method as recited in claim 28, comprising:
obtaining a gradient image of said segmented image; and determining said internal and external skinlines using said gradient image.

30. A method as recited in claim 28, wherein determining said internal skinline comprises:
obtaining a gray value profile perpendicular to a border of said feature; and
determining a local gradient minimum in said gray value profile as said internal skinline.

31. A method as recited in claim 28, wherein determining said external skinline comprises:
determining an initial external skinline of said feature;
calculating a second derivative of a dark-side LaPlacian; and
determining said external skinline as a ridge in said second derivative.

32. A method as recited in claim 31, wherein determining said external skinline as said ridge comprises:
determining a gray scale skeleton of pixels in said gradient image; and
determining a maxima ridge in said skeleton as said external skinline.

33. A method as recited in claim 28, further comprising determining skin thickening using said internal and external skinlines.

34. A method as recited in claim 28, further comprising superimposing said internal and external skinlines on said image.

35. A method as recited in claim 1, wherein:
said step of segmenting said image produces a segmented image; and
said method further comprises:
determining an external skinline using said segmented image;
calculating a distance of pixels of said image being potential feature pixels to said external skinline;
determining an average gray value of said potential feature pixels as a function of said distance; and
enhancing a periphery of said image using said average gray value.

36. A system for segmenting images, comprising:
an image acquisition device;
an image memory connected to said image acquisition device;
a local range circuit connected to said image memory;
a modified global thresholding circuit connected to said local range circuit;
a distance map circuit connected to said modified global thresholding circuit;
a contouring circuit connected to distance map circuit;
a contour connection circuit connected to said contouring circuit; and
a display.

37. A system as recited in claim 36, comprising:
a noise filtering circuit connected between said image memory and said local range circuit;
a region growing circuit connected to said modified global histogram circuit;
an erosion circuit connected between said region growing circuit and said distance map circuit; and
a superimposing circuit connected between said contour connection circuit and said display.

38. A system as recited in claim 36, comprising:
a skinline identification circuit.

39. A system for segmenting images, comprising:
an image acquisition device;
means for determining a global histogram of said image connected to said image acquisition device;
means for determining a local range of said global histogram connected to said means for determining a global histogram;
means for modifying said global histogram using said local range;
means for segmenting said image based upon said modified global histogram.

40. A system as recited in claim 39, further comprising:
means for contouring an image segmented by said means for segmenting; and
a display.

41. A system for segmenting and determining a skinline in an image, comprising:
an image acquisition device;
a segmentation circuit connected to said image acquisition device;
a gradient circuit connected to said segmentation circuit;
a local optimization circuit connected to said gradient circuit;
a skinline identification circuit; and
a skin analysis circuit.

42. A system as recited in claim 41, wherein said gradient circuit produces a gradient image; and
wherein said local optimization circuit comprises:
means for calculating a second derivative of a dark-side LaPlacian of said gradient image; and
means for finding a ridge in said second derivative.

43. A system as recited in claim 42, wherein said means for finding a ridge comprises:
means for generating a gray scale skeleton; and
means for finding a maxima ridge in said gray scale skeleton.

44. A system for segmenting an image having an anatomic feature and determining a skinline in said image, comprising:
an image acquisition device;
a segmentation circuit connected to said image acquisition device;
a skinline identification circuit connected to said segmentation circuit;
a distance circuit connected to said skinline identification circuit; and
an image enhancement circuit connected to said distance circuit.

45. A system as recited in claim 44, wherein:
said segmentation circuit comprises means for obtaining a segmented image having a plurality of pixels;
said distance circuit comprises means for determining a distance of selected pixels of said segmented image from said skinline; and
said image enhancement circuit comprises means for determining average gray values of pixels in said segmented image as a function of said distance and means for enhancing a peripheral region of said feature.

46. A system as recited in claim 45, further comprising:
a curve fitting circuit connected to said enhancement circuit and having means for fitting a curve to said average gray values as a function of said distance.

* * * * *